US010091760B2

United States Patent
Lee et al.

(10) Patent No.: US 10,091,760 B2
(45) Date of Patent: Oct. 2, 2018

(54) METHOD AND APPARATUS FOR TRANSMITTING PAGING FOR V2X COMMUNICATION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/540,254

(22) PCT Filed: Dec. 28, 2015

(86) PCT No.: PCT/KR2015/014365
§ 371 (c)(1),
(2) Date: Jun. 27, 2017

(87) PCT Pub. No.: WO2016/108555
PCT Pub. Date: Jul. 7, 2016

(65) Prior Publication Data
US 2017/0374642 A1    Dec. 28, 2017

Related U.S. Application Data

(60) Provisional application No. 62/097,589, filed on Dec. 30, 2014.

(51) Int. Cl.
H04W 68/00    (2009.01)
H04W 4/00    (2018.01)
H04W 4/70    (2018.01)

(52) U.S. Cl.
CPC ......... *H04W 68/005* (2013.01); *H04W 4/005* (2013.01); *H04W 4/70* (2018.02)

(58) Field of Classification Search
CPC ....... H04W 68/00; H04W 68/02; H04W 4/00; H04W 4/005; H04W 4/02; H04W 4/021;
(Continued)

(56) References Cited

U.S. PATENT DOCUMENTS 8,260,287 B2    9/2012    Yi et al.
8,761,166 B2    6/2014    Scott et al.
(Continued)

FOREIGN PATENT DOCUMENTS

KR    1020140033277    3/2014
WO    2013155443    10/2013
(Continued)

OTHER PUBLICATIONS

PCT International Application No. PCT/KR2015/014365, Written Opinion of the International Searching Authority dated Apr. 5, 2016, 6 pages.
(Continued)

*Primary Examiner* — Meless Zewdu
(74) *Attorney, Agent, or Firm* — Lee Hong Degerman Kang Waimey

(57) ABSTRACT

A method and apparatus for transmitting a paging for vehicle-to-everything (V2X) communication in a wireless communication system is provided. A network node receives data corresponding to the V2X communication from a first UE, and transmits the paging indicating the V2X communication to a second UE. The network node may further broadcast the data to one or more UEs.

7 Claims, 15 Drawing Sheets

(58) Field of Classification Search
CPC ....... H04W 4/023; H04W 4/046; H04W 4/06;
H04W 4/08; H04W 4/12; H04W 4/14;
H04W 4/22; H04W 74/08; H04W 24/02;
H04W 24/10; H04W 76/00; H04W
84/027; H04W 84/18; H04W 88/08;
H04W 28/00; H04W 28/02; H04W
28/021; H04W 72/00; H04W 72/005;
H04W 76/002; H04W 4/70; H04W
68/005; H04W 4/46; H04W 4/04; H04W
4/80; H04W 4/90; H04W 28/0215
See application file for complete search history.

(56) References Cited

U.S. PATENT DOCUMENTS

| | | |
|---|---|---|
| 2007/0146162 A1 | 6/2007 | Tengler et al. |
| 2011/0040888 A1 | 2/2011 | Krishnaswamy et al. |
| 2011/0149814 A1 | 6/2011 | Mottier |
| 2012/0008586 A1 | 1/2012 | Kwon et al. |
| 2012/0071185 A1 | 3/2012 | Dayal et al. |
| 2012/0163235 A1 | 6/2012 | Ho et al. |
| 2012/0275391 A1 | 11/2012 | Cui et al. |
| 2013/0013181 A1* | 1/2013 | Wang ............... G08G 1/096791 701/119 |
| 2013/0028184 A1 | 1/2013 | Lee et al. |
| 2013/0044706 A1* | 2/2013 | Suzuki ............... H04W 72/042 370/329 |
| 2013/0188612 A1 | 7/2013 | Dinan |
| 2013/0293394 A1 | 11/2013 | Rubin et al. |
| 2013/0294283 A1 | 11/2013 | Van Phan et al. |
| 2013/0310086 A1 | 11/2013 | Hu et al. |
| 2013/0331125 A1* | 12/2013 | Dini ............... G01S 5/02 455/456.1 |
| 2014/0002276 A1 | 1/2014 | Iyer et al. |
| 2014/0010179 A1 | 1/2014 | Lee |
| 2014/0023008 A1 | 1/2014 | Ahn et al. |
| 2014/0126399 A1 | 5/2014 | Damnjanovic |
| 2014/0179330 A1 | 6/2014 | Du et al. |
| 2014/0213186 A1* | 7/2014 | Gage ............... H04W 4/023 455/41.2 |
| 2014/0243038 A1* | 8/2014 | Schmidt ............... H04W 76/023 455/552.1 |
| 2014/0328329 A1* | 11/2014 | Novlan ............... H04W 72/042 370/336 |
| 2015/0003311 A1 | 1/2015 | Feuersaenger et al. |
| 2015/0009910 A1* | 1/2015 | Ryu ............... H04W 72/04 370/329 |
| 2015/0078302 A1* | 3/2015 | Reial ............... H04L 5/0053 370/329 |
| 2015/0163689 A1 | 6/2015 | Lee et al. |
| 2015/0195827 A1 | 7/2015 | Feng et al. |
| 2015/0223155 A1* | 8/2015 | Turtinen ............... H04W 48/08 370/329 |
| 2015/0245397 A1 | 8/2015 | Sachs et al. |
| 2015/0271846 A1 | 9/2015 | Kowalski et al. |
| 2015/0271860 A1 | 9/2015 | Baghel et al. |
| 2015/0296411 A1* | 10/2015 | Meyer ............... G08G 1/0112 370/336 |
| 2015/0326484 A1 | 11/2015 | Cao et al. |
| 2015/0327157 A1 | 11/2015 | Al-Shalash |
| 2016/0044707 A1 | 2/2016 | Folke et al. |
| 2016/0057795 A1 | 2/2016 | Kim et al. |
| 2016/0066337 A1 | 3/2016 | Sartori et al. |
| 2016/0087804 A1* | 3/2016 | Park ............... H04L 67/12 713/156 |
| 2016/0094975 A1 | 3/2016 | Sheng |
| 2016/0128082 A1 | 5/2016 | Chen et al. |
| 2016/0135155 A1 | 5/2016 | Al-Shalash et al. |
| 2016/0174122 A1 | 6/2016 | Sorrentino et al. |
| 2016/0345357 A1 | 11/2016 | Fan et al. |
| 2017/0041773 A1 | 2/2017 | Fujishiro et al. |
| 2017/0069207 A1* | 3/2017 | Ma ............... H04L 29/08 |
| 2017/0230938 A1 | 8/2017 | Huang et al. |
| 2017/0251486 A1* | 8/2017 | Hu ............... H04W 72/10 |
| 2017/0367058 A1 | 12/2017 | Pelletier et al. |

FOREIGN PATENT DOCUMENTS

| | | | |
|---|---|---|---|
| WO | 2013191353 | 12/2013 | |
| WO | 2014000183 | 1/2014 | |
| WO | 2014012244 | 1/2014 | |
| WO | 2014015470 | 1/2014 | |
| WO | 2014064280 A1 * | 5/2014 | ............. H04L 29/08 |
| WO | 2014163287 | 10/2014 | |
| WO | 2014179922 | 11/2014 | |

OTHER PUBLICATIONS

United States Patent and Trademark Office U.S. Appl. No. 15/538,427, Office Action dated Dec. 14, 2017, 25 pages.
PCT International Application No. PCT/KR2015/014364, International Search Report dated Apr. 29, 2016, 3 pages.
PCT International Application No. PCT/KR2015/014349, International Search Report dated Apr. 8, 2016, 4 pages.
PCT International Application No. PCT/KR2015/014357, International Search Report dated Apr. 11, 2016, 3 pages.
Renesas Mobile, "ProSe scenarios and use cases", 3GPP TSG RAN WG2 Meeting #83, R2-132652, Aug. 2013, 7 pages.
Qualcomm Incorporated, "TP for D2D for TS 36.300", R1-143678, 3GPP TSG-RAN WG1 #78, Aug. 2014, 19 pages.
European Patent Office Application Serial No. 15875647.8, Search Report dated Jun. 8, 2018, 9 pages.
Qualcomm Incorporated, "TP for D2D for TS 36.300", 3GPP Draft; R1-143678 TP TS 36_300, 3rd Generation Partnership Project (3GPP), Mobile Competence Centre; 650, Route Des Lucioles, F-06921 Sophia-Antipolis Cedex, France, vol. RAN WG1, No. Dresden, Germany; Aug. 18, 2014-Aug. 22, 2014, Oct. 5, 2014, XP050885117, Retrieved from the Internet: URL: http://www.3gpp.org/ftp/tsg_ran/WG1_RL1/TSGR1_78/Docs/ [retrieved on Oct. 5, 2014], p. 1-p. 8, p. 12-p. 13.
U.S. Appl. No. 15/536,637, Office Action dated Jun. 14, 2018, 27 pages.
U.S. Appl. No. 15/541,010, Office Action dated Jun. 15, 2018, 29 pages.
European Patent Office Application Serial No. 15875645.2, Search Report dated Jul. 26, 2018, 9 pages.
QUALCOMM, et al., "Introduction of ProSe", 3GPP TSG RAN WG2 Meeting #88, R2-145417, Nov. 2014, 37 pages.
U.S. Appl. No. 15/538,427, Office Action dated Aug. 16, 2018, 17 pages.
U.S. Appl. No. 15/540,542, Office Action dated Jul. 6, 2018, 30 pages.

* cited by examiner

METHOD AND APPARATUS FOR TRANSMITTING PAGING FOR V2X COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2015/014365, filed on Dec. 28, 2015, which claims the benefit of U.S. Provisional Application No. 62/097,589, filed on Dec. 30, 2014, the contents of which are all hereby incorporated by reference herein in its entirety.

BACKGROUND OF THE INVENTION

Field of the Invention

The present invention relates to wireless communications, and more particularly, to a method and apparatus for transmitting a paging for vehicle-to-everything (V2X) communication in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Vehicle-to-everything (V2X) communication is the passing of information from a vehicle to any entity that may affect the vehicle, and vice versa. This information exchange can be used for a host of safety, mobility and environmental applications to include driver assistance and vehicle safety, speed adaptation and warning, emergency response, safety, traveler information, navigation, traffic operations and demand management, personal navigation, commercial fleet planning and payment transactions. There is significant societal benefit and commercial value to delivering safety, mobility and convenience applications that rely on V2X.

V2X applications span a host of media. Basic elements of V2X are the vehicle and its connectivity to any other intelligent transportation system (ITS) station. Therefore, V2X includes transceivers located on vehicles, mounted on the roadside infrastructure, in aftermarket devices, or within handheld devices. V2X communication may occur in some of contexts of vehicle to vehicle (V2V) communication, vehicle to infrastructure (V2I) communication, vehicle to pedestrian (V2P) (or other vulnerable road users) communication, or vehicle to home communication (V2H).

The wide variety of use cases cannot only be met with a short-range radio solution working in a peer to peer manner. Some V2X use cases require infrastructure assistance for communication, and some use cases can make use of smaller scale infrastructure such as small cells or methods such as relaying. For this, the 3GPP has a role to play in defining, examining and acting on the variety of use cases to support the V2X effort. 3GPP infrastructure and 3GPP proximity-based services (ProSe) can act in support and enhancement to dedicated short range communications (DSRC) to fulfil many use cases. There is also the opportunity for 3GPP to investigate modifications and enhancements to ProSe to meet or improve the performance of short range communications in terms of spectral efficiency, effective range, bandwidth and throughput, error resiliency, and improved latency.

Accordingly, various methods for performing V2X communication based on 3GPP technology needs to be defined.

SUMMARY OF THE INVENTION

The present invention provides a method and apparatus for transmitting a paging for vehicle-to-everything (V2X) communication in a wireless communication system. The present invention provides a method and apparatus for performing cell-specific broadcast of V2X communication.

In an aspect, a method for transmitting, by a network node, a paging for vehicle-to-everything (V2X) communication in a wireless communication system is provided. The method includes receiving data corresponding to the V2X communication from a first UE, and transmitting the paging indicating the V2X communication to a second UE.

In another aspect, a network node is provided. The network node includes a memory, a transceiver, and a processor coupled to the memory and the transceiver, and configured to control the transceiver to receive data corresponding to the V2X communication from a first UE, and control the transceiver to transmit the paging indicating the V2X communication to a second UE.

Paging for V2X communication can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
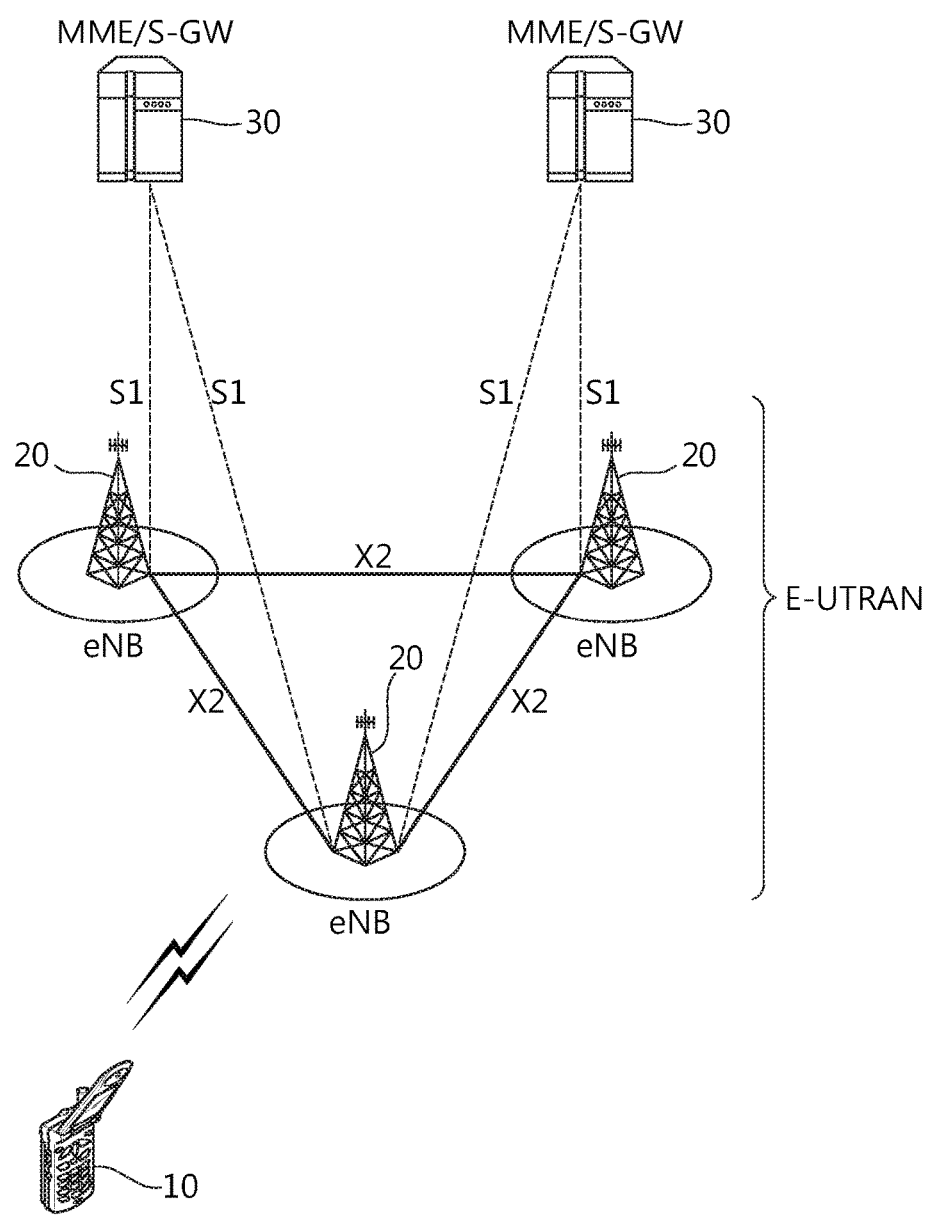
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
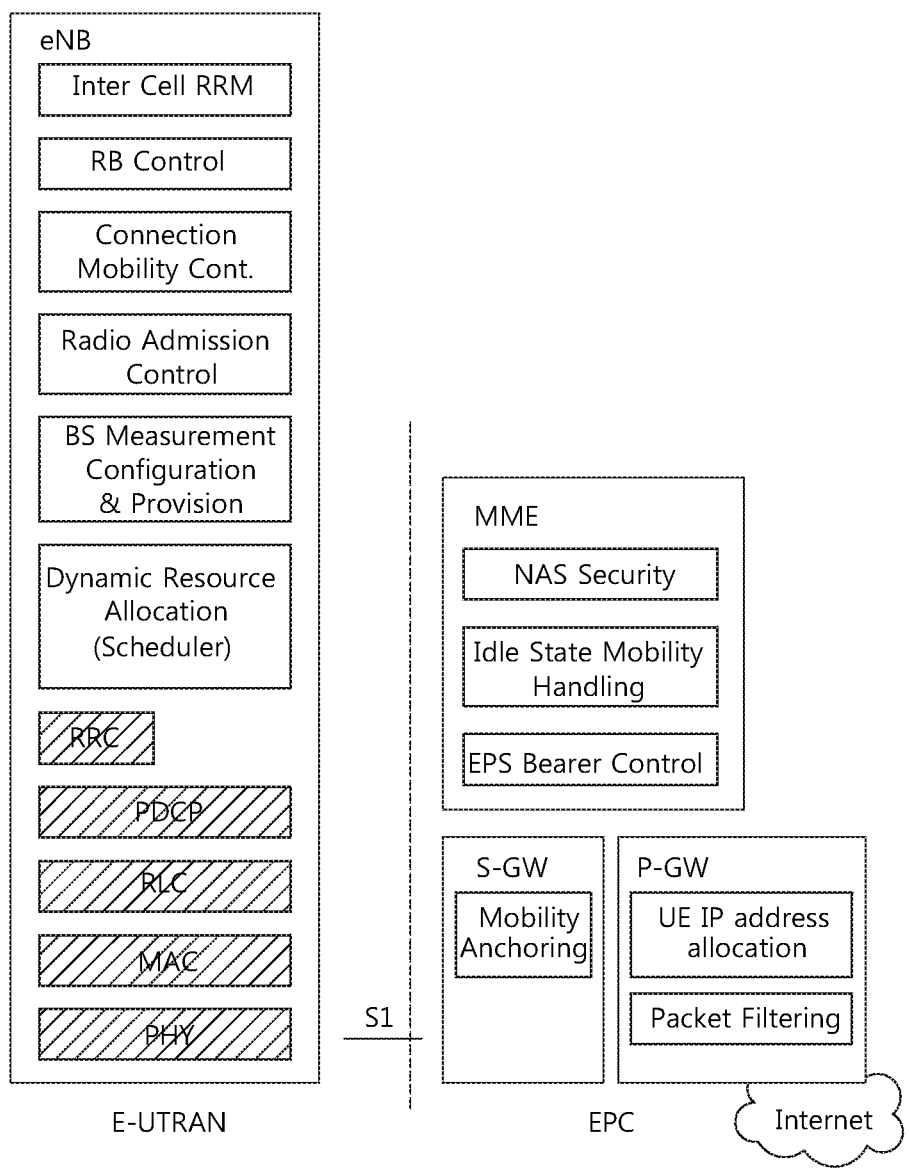
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
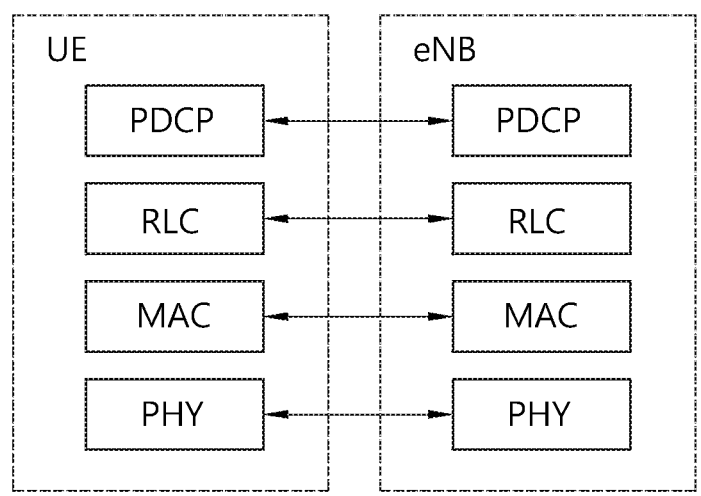
FIG. 3 shows a block diagram of a user plane protocol stack of an LTE system.
Figure 4:
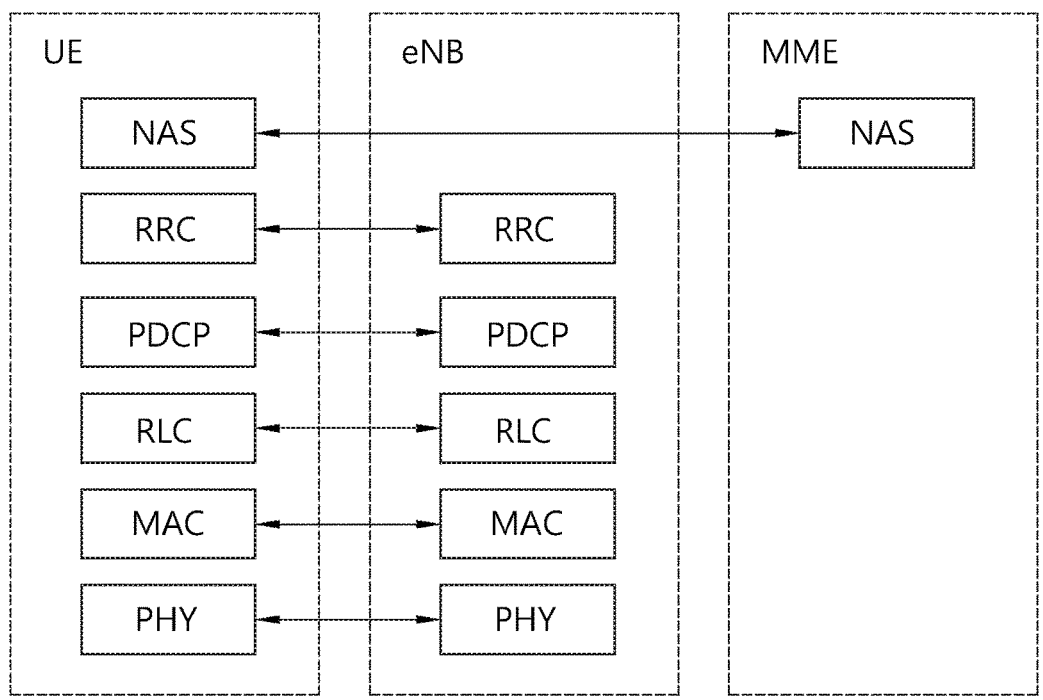
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
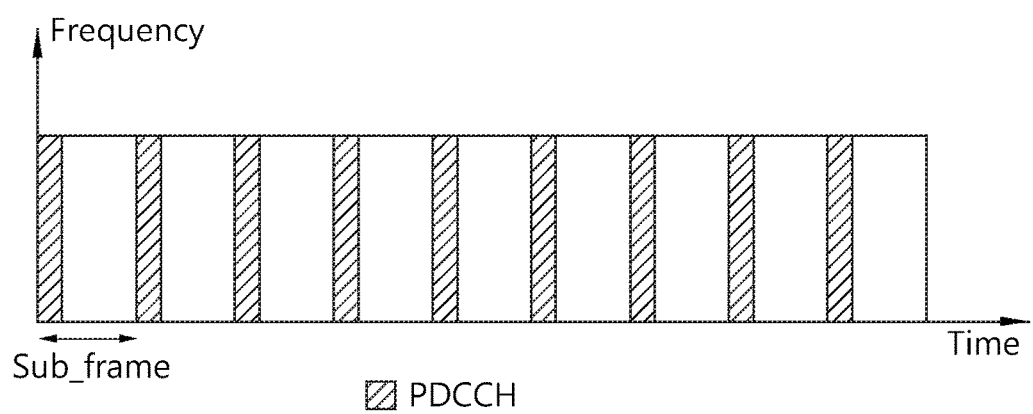
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

Figure 6:
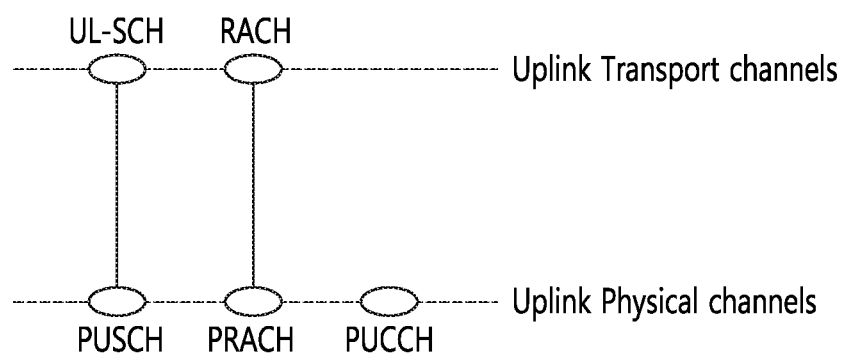
FIG. 6 shows mapping between UL transport channels and UL physical channels.

FIG. 6 shows mapping between UL transport channels and UL physical channels. Referring to FIG. 6, an uplink shared channel (UL-SCH) may be mapped to a physical uplink shared channel (PUSCH). The UL-SCH may be characterized by:
   possibility to use beamforming;
   support for dynamic link adaptation by varying the transmit power and potentially modulation and coding;
   support for HARQ;
   support for both dynamic and semi-static resource allocation.
Further, a random access channel (RACH) may be mapped to a physical random access channel (PRACH). The RACH may be characterized by:
   limited control information;
   collision risk.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Figure 7:
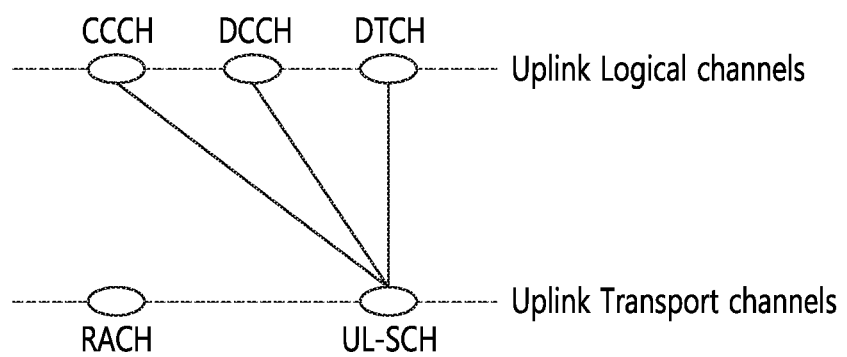
FIG. 7 shows mapping between UL logical channels and UL transport channels.

FIG. 7 shows mapping between UL logical channels and UL transport channels. Referring to FIG. 7, the CCCH may be mapped to the UL-SCH. The DCCH may be mapped to the UL-SCH. The DTCH may be mapped to the UL-SCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Sidelink (SL) is UE to UE interface for ProSe direct communication and ProSe direct discovery. The sidelink corresponds to the PC5 interface. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 8:
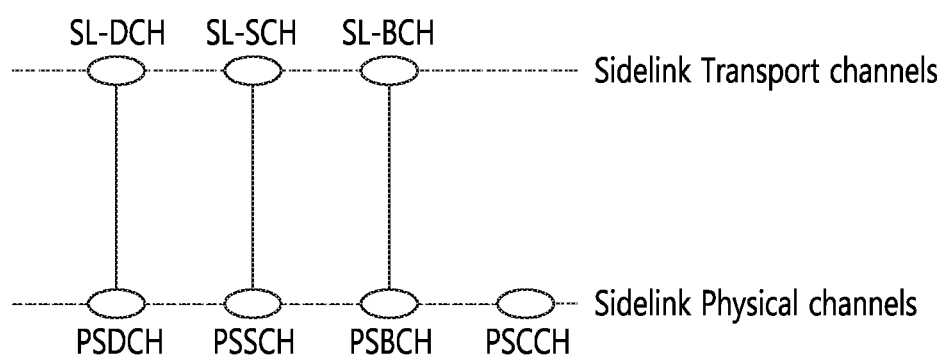
FIG. 8 shows mapping between SL transport channels and SL physical channels.

FIG. 8 shows mapping between SL transport channels and SL physical channels. Referring to FIG. 8, a SL discovery channel (SL-DCH) may be mapped to a physical SL discovery channel (PSDCH), which carries ProSe direct discovery message from the UE. The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

Further, a SL shared channel (SL-SCH) may be mapped to a physical SL shared channel (PSSCH), which carries data from a UE for ProSe direct communication. The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

Further, a SL broadcast channel (SL-BCH) may be mapped to a physical SL broadcast channel (PSBCH), which carries system and synchronization related information transmitted from the UE. The SL-BCH is characterized by pre-defined transport format.

A physical SL control channel (PSCCH) carries control from a UE for ProSe direct communication. The PSCCH is mapped to the SL control resources. The PSCCH indicates resource and other transmission parameters used by a UE for PSSCH.

Figure 9:
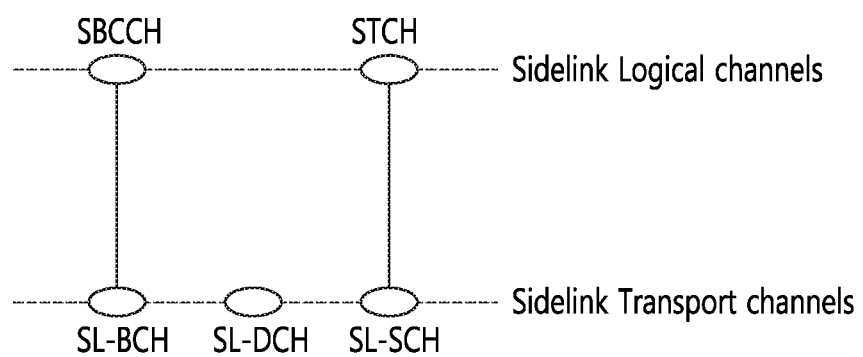
FIG. 9 shows mapping between SL logical channels and SL transport channels for ProSe direct communication.

FIG. 9 shows mapping between SL logical channels and SL transport channels for ProSe direct communication. Referring to FIG. 9, a SL broadcast control channel (SBCCH) may be mapped to the SL-BCH. The SBCCH is a SL channel for broadcasting SL system information from one UE to other UE(s). This channel is used only by ProSe direct communication capable UEs. Further, a SL traffic channel (STCH) may be mapped to the SL-SCH. The STCH is a point-to-multipoint channel, for transfer of user information from one UE to other UEs. This channel is used only by ProSe direct communication capable UEs.

The vehicular communication, referred to as vehicle-to-everything (V2X), contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. Vehicle-to-network (V2N) is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Figure 10:
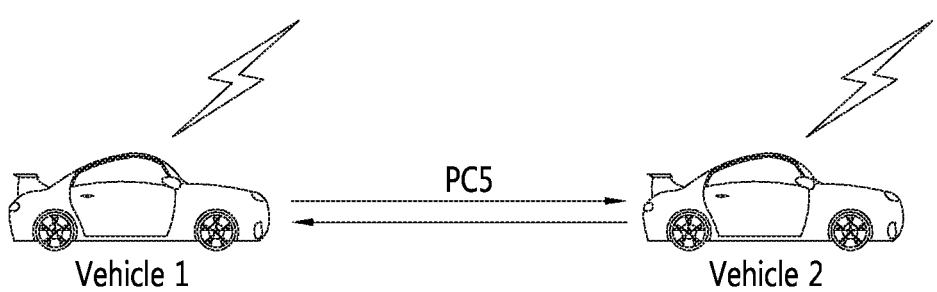
FIG. 10 shows an example of a scenario of V2X communication.

FIG. 10 shows an example of a scenario of V2X communication. Referring to FIG. 10, vehicle 1 and vehicle 2 are communicated with each other directly via PC5 interface.

Figure 11:
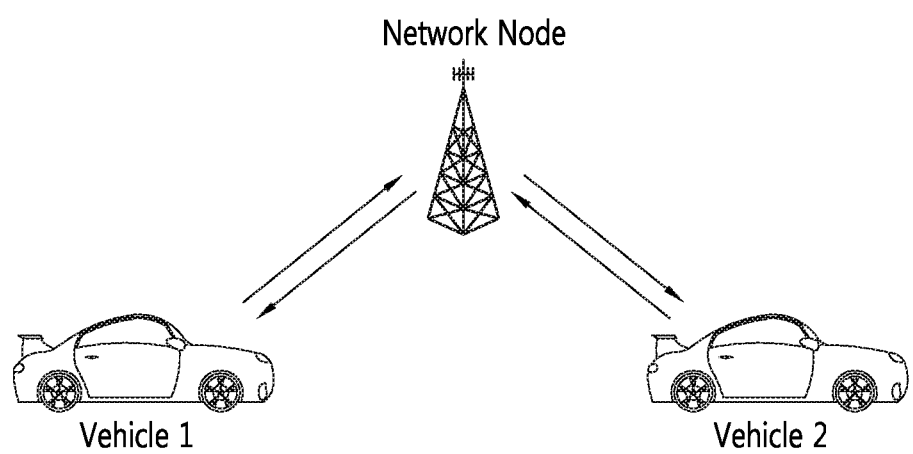
FIG. 11 shows another example of a scenario of V2X communication.

FIG. 11 shows another example of a scenario of V2X communication. Referring to FIG. 11, vehicle 1 and vehicle 2 are communicated with each other indirectly via the network. The network node may be one of an eNB, a new entity for V2X communication, a new gateway for V2X communication, a RSU, etc. The network node may not be the MME or S-GW.

Figure 12:
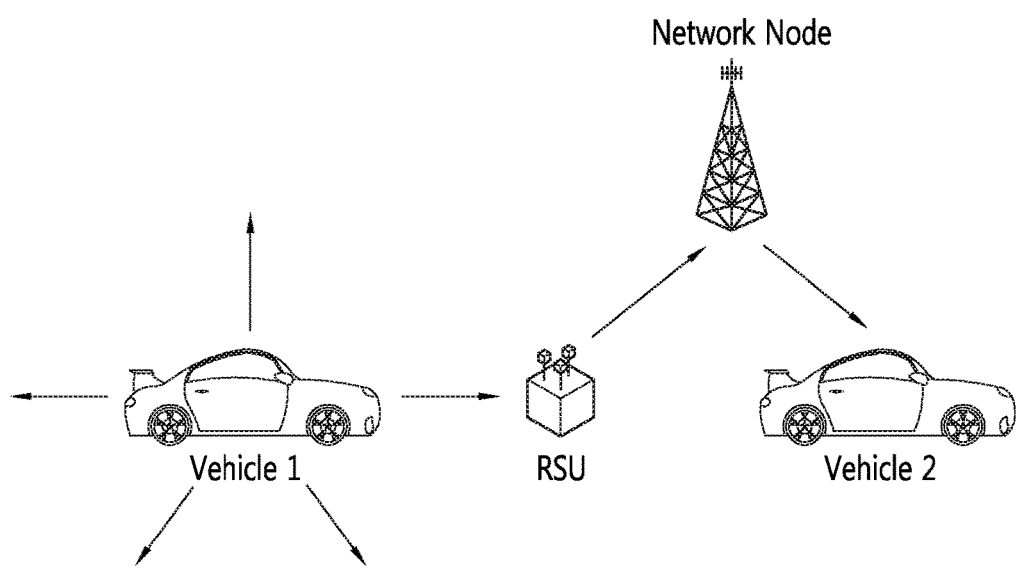
FIG. 12 shows another example of a scenario of V2X communication.

FIG. 12 shows another example of a scenario of V2X communication. Referring to FIG. 12, vehicle 1 broadcasts data, and the RSU receives the broadcast data. The RSU and vehicle 2 are communicated with each other indirectly via the network. The network node may be one of an eNB, a new entity for V2X communication, a new gateway for V2X communication, a RSU, etc. The network node may not be the MME or S-GW.

As described above, in 3GPP rel-12, ProSe allows a UE to discover another UE within an authorized range either directly or with the network assistance. The discovery process is under network control, and provides additional service related information to the discoverer UE. In addition, for public safety use, the UEs within the allowed range are able to directly communicate with each other using group based communication. Further in 3GPP rel-13, there are plans for further enhancements to ProSe to support restricted discovery and targeted discovery, in which the user is able to control who can discover him/her, and to operate in a mode to only announce upon a request. The one-to-one communication and relay support are also considered to be added for direct communication.

All these features can find a good application in the V2X use cases. However, in 3GPP rel-12 and rel-13, the ProSe has been designed for use with pedestrian mobility speed. It would therefore not be able to be used directly for V2X. For example, the physical channel assumptions may not be suitable for direct discovery and communication in vehicle speed, and UE to network signaling delays would limit its usefulness for V2X. Enhancements are necessary to adapt the ProSe system to support V2X.

When the current ProSe is used for V2X communication, the following problems may occur.

(1) In urban area, the number of vehicles is expected to be large. In such dense scenario, there may be many vehicles that transmit road safety messages on SL, so that SL resources may be highly utilized and collision probability will be normally high. Such problem will cause unstable intelligent transportation system (ITS) service to vehicles. In this sense, offloading ITS traffic from SL to another direction may be beneficial.

(2) V2V and V2I communication may normally happen in a local area. V2V and V2I communication may not aim at a specific user. Rather, this communication may be open to all neighboring vehicles in a local area. In addition, such communication will require lower latency. Thus, fast broadcast mechanism may be needed.

In order to solve the problem described above, according to an embodiment of the present invention, a method for performing paging for V2X communication may be proposed. Hereinafter, the connectionless transmission may be a specific type of UE-to-UE transmission via network. In connectionless transmission, data/message/signaling may not be routed to the S-GW, but it may be transferred from one or more UEs to one or more other UEs via network. The network node may be one of an eNB, a new entity for V2X communication, a new gateway for V2X communication, a RSU, etc. The network node may not be the MME or S-GW. Data/message/signaling may be specific to V2X communication, i.e. communication between vehicles or communication between a vehicle and other type of device. The connectionless transmission may be efficient for V2X communication, because connectionless transmission would not require connection establishment/management between the network and vehicles. Further, the bi-directional transmission may consist of UL transmission and SL transmission. In the bi-directional transmission, traffic may be transmitted in either UL or in SL. Or, in the bi-directional transmission, transmission from a UE to another UE may be performed in either UL or in SL.

Figure 13:
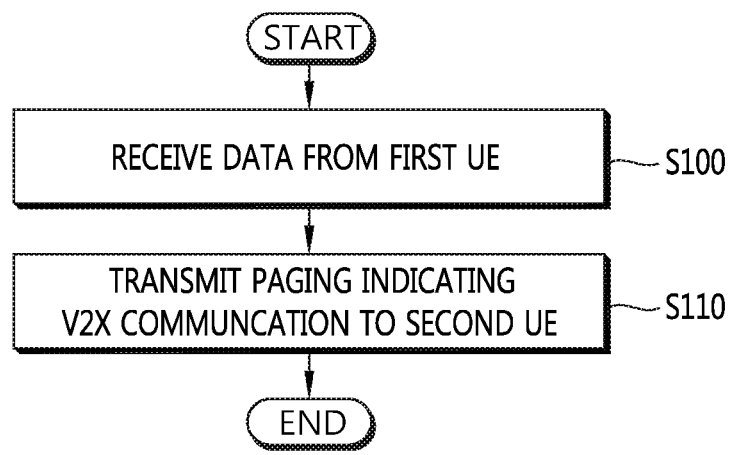
FIG. 13 shows a method for transmitting a paging for V2X communication according to an embodiment of the present invention.

FIG. 13 shows a method for transmitting a paging for V2X communication according to an embodiment of the present invention.

In step S100, the network node receives data corresponding to the V2X communication from a first UE. In step S110, the network node transmits the paging indicating the V2X communication to a second UE. The network node may be one of an eNB, a new entity for the V2X communication, a new gateway for the V2X communication, or a RSU. The first UE and the second UE may be a vehicle. The V2X communication is a vehicular communication between vehicles or between a vehicle and other type of device.

The network node may broadcast the received data to one or more UEs. The data may be broadcast via the paging. Or, the data may be broadcast via system information a common channel or a multimedia broadcast multicast services (MBMS) channel. The network node may determine whether to relay the data to one or more UEs. The network node may further reconstruct the received data. Further, the network node may transmit a specific radio network temporary identity (RNTI), which schedules the transmission of the paging for the V2X communication, via a PDCCH.

Figure 14:
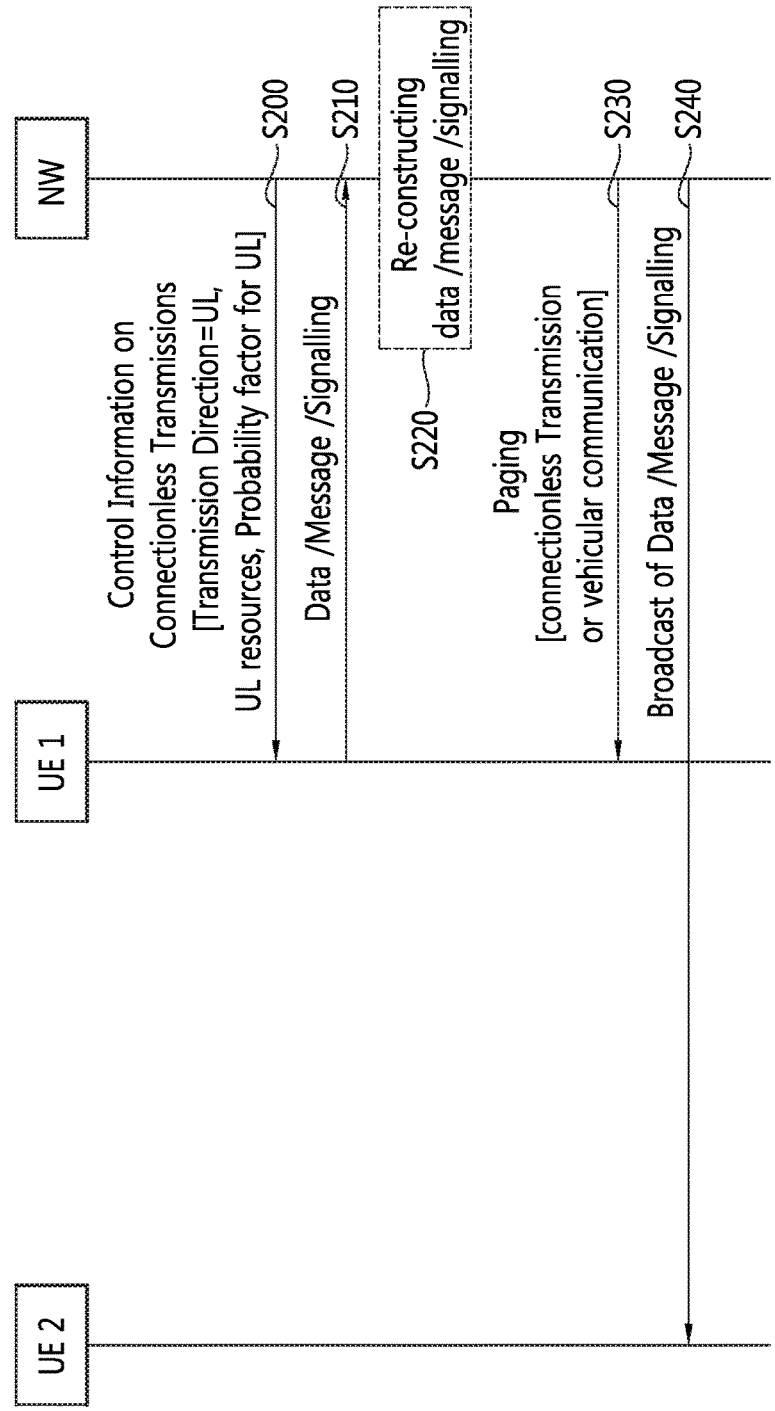
FIG. 14 shows a method for transmitting a paging for V2X communication according to another embodiment of the present invention.

FIG. 14 shows a method for transmitting a paging for V2X communication according to another embodiment of the present invention. According to this embodiment, the network node receives data/message/signaling from one or more UEs and may re-construct data/message/signaling. The network node may broadcast the re-constructed data/message/signaling via paging, system information, common channel, or MBMS channel. The paging may indicate V2X communication and/or connectionless transmission.

In step S200, the first UE receives control information on connectionless transmission at a cell. The control information may indicate that the cell supports connectionless transmission. The control information may indicate UL transmission direction, if this transmission corresponds to bi-directional transmission by which the UE can transmit a packet in UL or in SL. The control information may include UL resource pool for connectionless transmission and a probability factor controlling whether or not the UE can perform UL connectionless transmission. The control information may include a set of SL TX resources which can be also used for UL transmission towards the network.

In step S210, the UE transmits data/message/signaling to the network. There may be a specific logical/transport channel for connectionless transmission which is called connectionless channel for this transmission.

Upon receiving data/message/signaling by UL connectionless transmission, in step S220, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S230, the network node transmits paging indicating V2X communication and/or connectionless transmission communication to the second UE. For this, the network node may transmit a specific RNTI for scheduling transmission of this paging to one or more UEs via PDCCH. This specific RNTI may be a connectionless paging RNTI (CLP-RNTI). The paging may also include the data/message/signaling towards one or more UEs as V2X communication and/or connectionless transmission. In this case, step S240 described below may not be performed.

Upon receiving paging indicating V2X communication and/or connectionless transmission, and if the data/message/signaling is not included in the paging, the UE receives broadcast of the data/message/signaling. The data/message/signaling may be transmitted via a system information block specific to V2X communication and/or connectionless transmission. This system information block may be updated immediately upon transmission of paging indicating V2X communication and/or connectionless transmission. Upon receiving the paging, the UE may immediately receive this system information block to receive the data/message/signaling. Alternatively, the data/message/signaling may be transmitted via a common channel which may be specific to V2X communication and/or connectionless transmission. In this case, PDCCH/ePDCCH may indicate a specific RNTI for V2X communication and/or connectionless transmission, i.e. CL-RNTI, for scheduling this transmission of the data/message/signaling. Alternatively, the data/message/signaling may be transmitted via a MBMS channel (such as MCCH or MTCH) on a multicast broadcast single frequency network (MBSFN) area or via single cell point-to-multipoint channel (e.g. DL-SCH). The channel or the MBSFN area may be specific to V2X communication and/or connectionless transmission.

Figure 15:
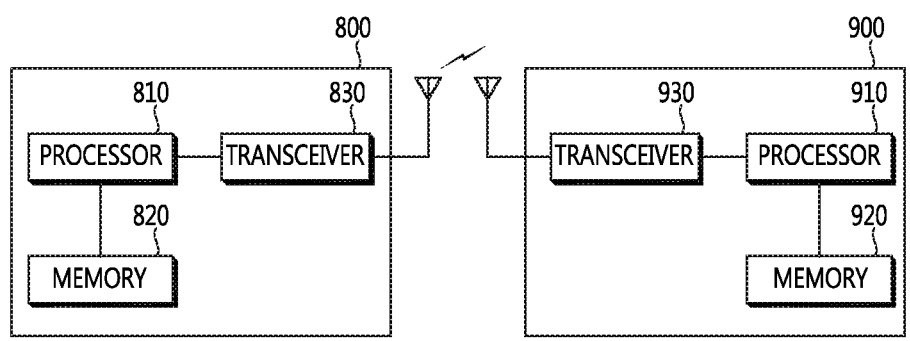
FIG. 15 shows a wireless communication system to implement an embodiment of the present invention.

FIG. 15 shows a wireless communication system to implement an embodiment of the present invention.

A network node 800 may include a processor 810, a memory 820 and a transceiver 830. The network node 800 may be one of an eNB, a new entity for V2X communication, a new gateway for V2X communication, a RSU, etc. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The UE 900 may be a vehicle. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:
1. A method for transmitting, by a network node, a paging for vehicle-to-everything (V2X) communication in a wireless communication system, the method comprising:
receiving data for the V2X communication from a first group of user equipments (UEs) via a specific channel by using a connectionless transmission, wherein the connectionless transmission is a specific type of transmission which the data is routed to a V2X gateway;

re-constructing the data by checking whether the data is duplicated or not; and transmitting the paging including the V2X communication to a second group of UEs, wherein the paging includes the re-constructed data.

2. The method of claim 1, wherein the transmitting the paging comprises:

determining whether to relay the data to the second group UEs via the page.

3. The method of claim 1, further comprising transmitting a specific radio network temporary identity (RNTI), which schedules the transmission of the paging including the V2X communication, via a physical downlink control channel (PDCCH).

4. The method of claim 1, wherein the network node is one of an evolved NodeB (eNB), a entity for the V2X communication, a gateway for the V2X communication, or a road side unit (RSU).

5. The method of claim 1, wherein one or more of the first group of UEs or the second group of UEs is a vehicle.

6. The method of claim 1, wherein the V2X communication is a vehicular communication between vehicles or between a vehicle and other type of device.

7. A network node comprising:

a memory;

a transceiver; and a processor coupled to the memory and the transceiver, and configured to:

control the transceiver to receive data for the V2X communication from a first group of user equipments (UE) via a specific channel by using a connectionless transmission, wherein the connectionless transmission is a specific type of transmission which the data is routed to a V2X gateway;

control the transceiver to re-construct the data by checking whether the data is duplicated or not; and control the transceiver to transmit a paging including the V2X communication to a second group of UEs, wherein the paging includes the re-constructed data.

\* \* \* \* \*